(12) United States Patent
Hatanaka et al.

(10) Patent No.: US 9,505,235 B2
(45) Date of Patent: *Nov. 29, 2016

(54) RECORDING METHOD AND RECORDING APPARATUS

(71) Applicant: FUJI XEROX CO., LTD., Tokyo (JP)

(72) Inventors: Mami Hatanaka, Kanagawa (JP); Hiroyuki Ueki, Kanagawa (JP); Reika Abe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/602,954

(22) Filed: Jan. 22, 2015

(65) Prior Publication Data

US 2016/0001579 A1    Jan. 7, 2016

(30) Foreign Application Priority Data

Jul. 7, 2014   (JP) ................................. 2014-139814

(51) Int. Cl.
| | |
|---|---|
| B41J 2/21 | (2006.01) |
| B41J 11/00 | (2006.01) |
| C09D 11/30 | (2014.01) |
| B41M 5/00 | (2006.01) |

(52) U.S. Cl.
CPC ............ *B41J 11/0015* (2013.01); *B41J 2/2107* (2013.01); *B41J 11/002* (2013.01); *B41M 5/0023* (2013.01); *C09D 11/30* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ................................................... 347/95–105
See application file for complete search history.

(56) References Cited

U.S. PATENT DOCUMENTS

| | | | |
|---|---|---|---|
| 2009/0114121 A1 | 5/2009 | Morohoshi et al. | |
| 2009/0263632 A1 | 10/2009 | Kojima et al. | |
| 2010/0215855 A1 | 8/2010 | Morohoshi et al. | |
| 2011/0043578 A1* | 2/2011 | Tojo | B41M 5/0023 347/102 |
| 2013/0155144 A1* | 6/2013 | Kunimine | B41J 2/07 347/20 |

FOREIGN PATENT DOCUMENTS

| | | | |
|---|---|---|---|
| JP | 2007-146135 A | 6/2007 | |
| JP | 2007-216664 A | 8/2007 | |
| JP | 2013-112801 A | 6/2013 | |

* cited by examiner

*Primary Examiner* — Manish S Shah
(74) *Attorney, Agent, or Firm* — Sughrue Mion, PLLC

(57) ABSTRACT

A recording method includes ejecting an ink on an recording medium, wherein the ink includes a colorant, polymer particles, water, and an aqueous organic solvent, has a static surface tension of equal to or less than 30 mN/m, and has a fluctuation range of a dynamic surface tension from after 1 millisecond to after 1 second of from 0.2 mN/m to 2.0 mN/m when measuring the dynamic surface tension by a maximum bubble pressure method, and wherein the recording medium has a maximum liquid absorption amount of the ink within a contact time of 500 milliseconds measured by a dynamic scanning liquid absorption meter of equal to or greater than 5 ml/m².

12 Claims, 1 Drawing Sheet

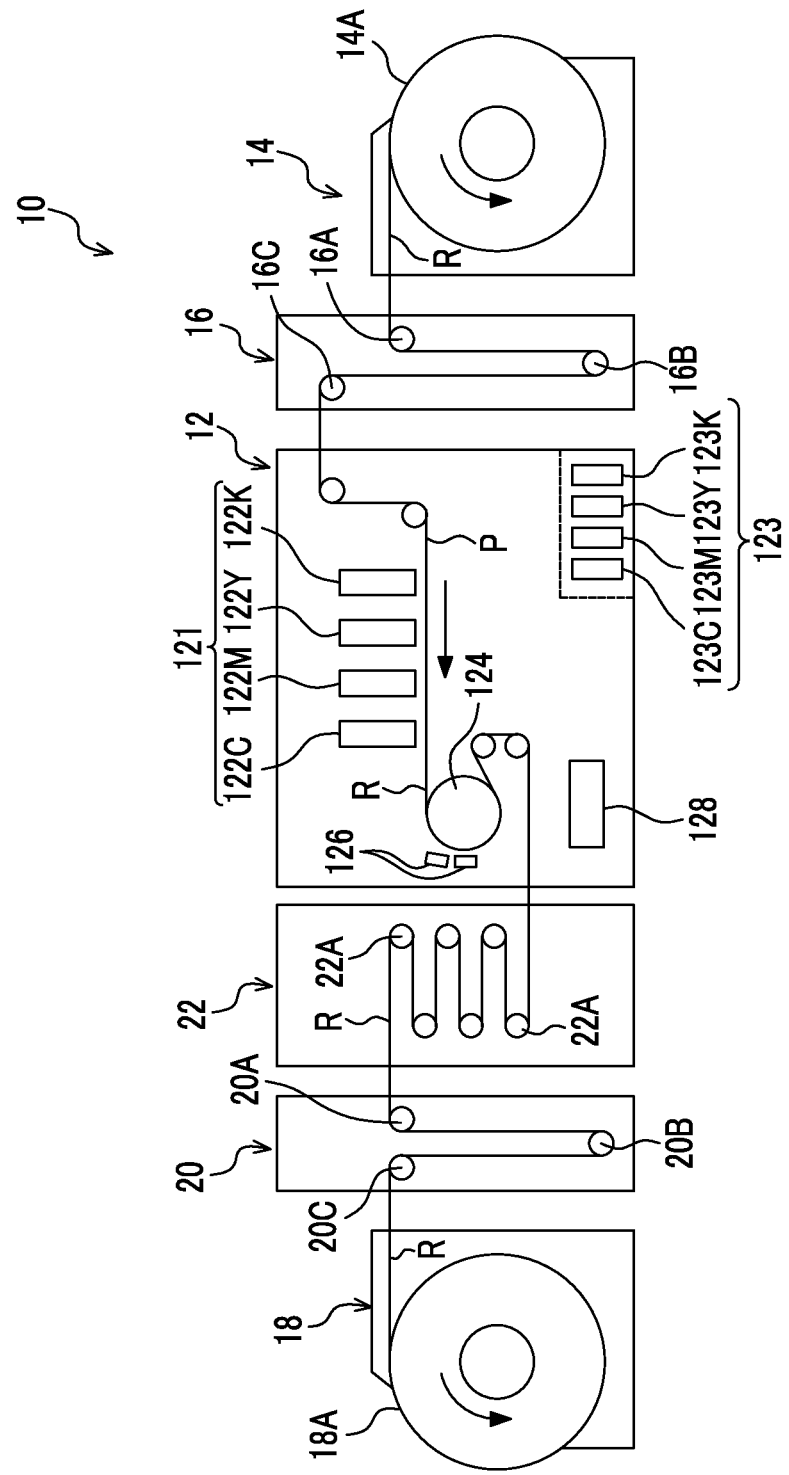

RECORDING METHOD AND RECORDING APPARATUS

CROSS-REFERENCE TO RELATED APPLICATIONS

This application is based on and claims priority under 35 USC 119 from Japanese Patent Application No. 2014-139814 filed Jul. 7, 2014.

BACKGROUND

1. Technical Field

The present invention relates to a recording method and a recording apparatus.

2. Related Art

SUMMARY

According to an aspect of the invention, there is provided a recording method including:

ejecting an ink on an recording medium, wherein the ink includes a colorant, polymer particles, water, and an aqueous organic solvent, has a static surface tension of equal to or less than 30 mN/m, and has a fluctuation range of a dynamic surface tension from after 1 millisecond to after 1 second of from 0.2 mN/m to 2.0 mN/m when measuring the dynamic surface tension by a maximum bubble pressure method, and wherein the recording medium has a maximum liquid absorption amount of the ink within a contact time of 500 milliseconds measured by a dynamic scanning liquid absorption meter of equal to or greater than 5 ml/m$^2$.

BRIEF DESCRIPTION OF THE DRAWING

Exemplary embodiments of the present invention will be described in detail based on the following FIGURE, wherein:

FIG. 1 is a schematic configuration diagram showing a recording apparatus according to the exemplary embodiment.

DETAILED DESCRIPTION

Hereinafter, the recording method and the recording apparatus of the present invention will be described in detail based on an exemplary embodiment which is an example.

The recording method according to the exemplary embodiment is a recording method including an ejecting process of ejecting an ink on a recording medium, in which the ink includes a colorant, polymer particles, water, and an aqueous organic solvent, has a static surface tension of equal to or less than 30 mN/m, and has a fluctuation range of dynamic surface tension from after 1 millisecond to after 1 second of from 0.2 mN/m to 2.0 mN/m when measuring the dynamic surface tension by a maximum bubble pressure method, and in which the recording medium has a maximum liquid absorption amount of the ink within a contact time of 500 milliseconds measured by a dynamic scanning liquid absorption meter of equal to or greater than 5 ml/m$^2$.

Here, in the specification, the ink used in the exemplary embodiment is referred to as "specific ink", and as described above, among recording media, a recording medium in which the maximum liquid absorption amount of the specific ink within a contact time of 500 milliseconds measured by a dynamic scanning liquid absorption meter is from 5 ml/m$^2$ to 15 ml/m$^2$ is referred to as "slightly permeable paper", and a recording medium in which the maximum liquid absorption amount is greater than 15 ml/m$^2$ is referred to as "permeable paper".

Moreover, the maximum liquid absorption amount in a recording medium is measured by the following method.

That is, the maximum liquid absorption amount in a recording medium is measured by using a dynamic scanning liquid absorption meter (hereinafter, referred to as "DSA", manufactured by Kumagai Riki Kogyo Co., Ltd.). The operating principle of the device is as follows. A recording material having a diameter of about 20 cm is fixed on a horizontally placed turntable, then, while rotating the turntable, a liquid supply head in which an ink is contained is brought into contact therewith, and scanning is performed on the sample in a spiral shape. The absorption rate of the ink is automatically measured from the amount of movement of the meniscus in a capillary connected to a head. The contact time between the liquid and the sample and the liquid absorption amount per unit area are calculated from a scanning speed, an absorption rate, and shape parameters of a head opening portion at a certain point in time, and it is possible to plot with respect to the square root of the contact time.

The maximum liquid absorption amount of the ink is a value obtained by measuring using ink left to stand in a sealed container for equal to or longer than 8 hours with respect to paper left to stand for equal to or longer than 8 hours in a standard environment (temperature of 23° C., relative humidity of 50% RH) specified in JIS P8111:1998 using the device.

In addition, the maximum liquid absorption amount of the ink is a value determined by the measurement result in a range in which the contact time between a liquid supply head in which an ink is contained and recording paper is from 10 milliseconds to 500 milliseconds in the above-described conditions.

Here, in a recording method for recording an image on a recording medium by ejecting an ink (ink jet recording method), as the recording medium, so-called coated paper (for example, slightly permeable paper described above) in which a coating layer is provided on one surface or both surfaces of the substrate and permeation of a liquid is slow is known.

When an ink is ejected on coated paper, permeation of the liquid into the coated paper is slow as described above, and thus, landed ink droplets remain on the coated paper with a height. For this reason, it takes a long period of time for the ink droplets to be dried. Therefore, a method for drying the ink droplets by heating the coated paper after an ink is ejected is used.

However, in a case of using an ink in the related art, there is a limit to the thermal drying, and by contact with a roller or the like in an apparatus used for drying, a recorded image is likely to be peeled off.

On the other hand, in a case of using an ink in the related art with respect to a recording medium (for example, the above-described permeable paper) in which permeation of a liquid is fast compared to coated paper, a phenomenon (hereinafter, referred to as "strike-through") in which a recorded image may be recognized from the surface on the opposite side to the image recording surface and bleeding of an image occur.

Therefore, in the recording method according to the exemplary embodiment, the specific ink which includes a colorant, polymer particles, water, and an aqueous organic solvent and of which fluctuation ranges of static surface tension and dynamic surface tension are within the above ranges is used.

The specific ink having the fluctuation ranges of static surface tension and dynamic surface tension within the above ranges is an ink of which the static surface tension is reduced, and the fluctuation range of dynamic surface tension is reduced. That is, the specific ink has a property of easily wetting and spreading on the surface of a recording medium.

Since the specific ink wets and spreads even on slightly permeable paper, drying efficiency is improved. In addition, it is considered that by forming a film of polymer particles in the specific ink, adhesiveness between the specific ink and the slightly permeable paper is improved, and fixability of an image also is improved.

As a result, when using slightly permeable paper, image peeling is prevented.

On the other hand, when the specific ink is ejected on permeable paper, together with wetting and spreading on the permeable paper, permeation into the inside of the permeable paper of a liquid component in the specific ink is promoted. It is considered that, at this time, since the polymer particles in the specific ink is solid content, permeation between fibers of the permeable paper is delayed, interaction between the polymer particles increases, and apparent viscosity increases, and thus, the polymer particles are likely to remain near the surface of the permeation paper.

In addition, it is considered that a colorant which is solid content is incorporated into a network due to the interaction between the polymer particles, and together with the polymer particles, the colorant is likely to remain near the surface of the permeation paper. In this manner, since it is difficult for the colorant to penetrate between fibers of the permeable paper, in permeable paper, strike-through of a recorded image is prevented.

In addition, when the colorant is incorporated into the network due to the interaction between the polymer particles as described above, in the permeable paper, bleeding of an image also is prevented.

As described above, in the recording method of the exemplary embodiment, in the slightly permeable paper, image peeling is prevented, and, in the permeable paper, strike-through and bleeding of an image are prevented.

Thus, since recording media having different permeabilities may be applied in the recording method according to the exemplary embodiment, the recording method according to the exemplary embodiment may be a recording method which is excellent in versatility with respect to a recording medium.

Specific Ink

The specific ink includes a colorant, polymer particles, water, and an aqueous organic solvent, and a static surface tension thereof is equal to or less than 30 mN/m, and a fluctuation range (hereinafter, also simply referred to as "fluctuation range of dynamic surface tension") of dynamic surface tension thereof from after 1 millisecond to after 1 second is from 0.2 mN/m to 2.0 mN/m when measuring the dynamic surface tension by a maximum bubble pressure method.

In the specific ink, the static surface tension is equal to or less than 30 mN/m, and from the viewpoint of ejection stability, the static surface tension is preferably from 21 mN/m to 30 mN/m, more preferably from 21 mN/m to 27 mN/m.

Here, the static surface tension is a value measured in an environment of 23° C. and 55% RH using a Wilhelmy-type tensiometer CBVP-Z (manufactured by Kyowa Interface Science Co., Ltd.).

In addition, the fluctuation range of dynamic surface tension in the specific ink is from 0.2 mN/m to 2.0 mN/m, and from the viewpoint of wetting and spreading in a shorter time and an advantage in dry fixing, the fluctuation range is preferably from 0.2 mN/m to 1.8 mN/m, and more preferably from 0.2 mN/m to 1.5 mN/m.

Moreover, the fluctuation range of dynamic surface tension is a difference between the value of dynamic surface tension after 1 millisecond and the value of dynamic surface tension after 1 second.

In the specific ink, the dynamic surface tension after 1 millisecond is preferably equal to or less than 32 mN/m, more preferably from 21 mN/m to 30 N/m, and still more preferably from 22 mN/m to 28 mN/m from the viewpoint of wetting and spreading in a shorter time and an advantage in dry fixing.

On the other hand, the dynamic surface tension after 1 second of the specific ink is preferably equal to or less than 30 mN/m, more preferably from 21 mN/m to 28 mN/m, and still more preferably from 22 mN/m to 28 mN/m.

The dynamic surface tension is a value measured in an environment of 23° C. and 55% RH by using a maximum bubble pressure method dynamic surface tension measuring device MPT-C (manufactured by LAUDA).

Moreover, the value of dynamic surface tension after 1 millisecond is a value of dynamic surface tension when reached a maximum bubble pressure at 1 millisecond after a new interface is formed at the tip of a capillary. However, in a case where the measuring limit of the maximum bubble pressure method dynamic surface tension measuring device is a dynamic surface tension after 1 millisecond, the value is represented as a dynamic surface tension after 0 milliseconds in some cases. In this case, the value of dynamic surface tension after 0 milliseconds is adopted as the value of dynamic surface tension after 1 millisecond.

On the other hand, the value of dynamic surface tension after 1 second is a value of dynamic surface tension when reached a maximum bubble pressure at 1 second after a new interface is formed at the tip of a capillary. However, in a case where the measuring limit of the maximum bubble pressure method dynamic surface tension measuring device is a dynamic surface tension after less than 1 second, the value of dynamic surface tension at the measuring limit is adopted as the value of dynamic surface tension after 1 second. This is because, in a case of a value of dynamic surface tension at the measuring limit, it may be considered that the dynamic surface tension is in a stable region.

Here, in the specific ink, in order to make the static surface tension, the fluctuation range of dynamic surface tension, and the dynamic surface tension after 1 millisecond or after 1 second be within the above range, for example, the specific ink may include a surfactant together with a colorant, polymer particles, water, and an aqueous organic solvent. That is, the static surface tension, the fluctuation range of dynamic surface tension, and the dynamic surface tension after 1 millisecond or after 1 second may be adjusted by the type and the amount of a surfactant.

As the surfactant, a surfactant of which HLB (hydrophile-lipophile balance) is equal to or less than 14 may be exemplified. For example, by adjusting the amount of surfactant of which HLB is equal to or less than 14, the static surface tension of the specific ink is easily adjusted to a desired static surface tension. In addition, with surfactants of which HLB is equal to or less than 14, when using plural types of surfactant having different HLB, the dynamic surface tension of the specific ink is easily adjusted to a desired static surface tension. Specifically, for example, when using a surfactant of which HLB is from 9 to 14 and a surfactant of which HLB is from 4 to 8, the dynamic surface tension of the specific ink is easily adjusted to a desired static surface tension.

Moreover, HLB (hydrophile-lipophile balance) is defined by the following expression (Griffin method).

HLB=20×(total of formula weight of hydrophilic portion/molecular weight)

As such a surfactant, at least one selected from the group consisting of ethylene oxide adducts of acetylene glycol and polyether-modified silicone may be exemplified.

The ethylene oxide adducts of acetylene glycol are, for example, a compound having an —O—$(CH_2CH_2O)_n$—H structure (moreover, for example, n represents an integer from 1 to 30) obtained by adding ethylene oxide to at least one hydroxyl group of acetylene glycol, and examples of commercially available products (moreover, numbers in parentheses indicate catalog values of HLB) of ethylene oxide adducts of acetylene glycol include Olfine E1004 (from 7 to 9), Olfine E1010 (from 13 to 14), Olfine EXP.4001 (from 8 to 11), Olfine EXP.4123 (from 11 to 14), Olfine EXP.4300 (from 10 to 13), Surfynol 104H (4), Surfynol 420 (4), Surfynol 440 (4), and Dynol 604 (8) (hereinbefore, manufactured by Nissin Chemicals Co., Ltd.).

For example, the content of the ethylene oxide adducts of acetylene glycol may be from 0.01% by weight to 10% by weight, and is preferably from 0.1% by weight to 5% by weight with respect to the specific ink.

The polyether-modified silicone is, for example, a compound in which a polyether group is bonded to a silicone chain (polysiloxane main chain) in a graft form, or in a block form. Examples of the polyether group include a polyoxyethylene group and a polyoxypropylene group. The polyether group may be, for example, a polyoxyalkylene group in which an oxyethylene group and an oxypropylene group are added in a block form or a random form.

As commercially available products (moreover, numbers in parentheses indicate catalog values of HLB) of the polyether-modified silicone, Silface SAG002 (12), Silface SAG503A (11), and Silface SAG005 (7) (hereinbefore, manufactured by Nissin Chemicals Co., Ltd.) may be exemplified.

For example, the content of the polyether-modified silicone may be from 0.01% by weight to 5% by weight, and is preferably from 0.05% by weight to 1% by weight with respect to the specific ink.

Next, the composition and characteristics of the specific ink will be described.

The specific ink includes a colorant, polymer particles, water, and an aqueous organic solvent.

Colorant

First, the colorant will be described.

As the colorant, a colorant corresponding to the specific ink having a desired color may be used, and specifically, a pigment may be exemplified. As the pigment, an organic pigment and inorganic pigment may be exemplified.

Specific examples of a black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, and Raven 1060 (hereinbefore, manufactured by Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (hereinbefore, manufactured by Cabot Corporation), Color Black FW1, Color Black FW2, Color Black FW2V, Color Black 18, Color Black FW200, Color Black 5150, Color Black 5160, Color Black 5170, Printex 35, Printex U, Printex V, Printex 140U, Printex 140V, Special Black 6, Special Black 5, Special Black 4A, and Special Black 4 (hereinbefore, manufactured by Degussa), and No. 25, No. 33, No. 40, No. 47, No. 52, No. 900, No. 2300, MCF-88, MA600, MA7, MA8, and MA100 (hereinbefore, manufactured by Mitsubishi Chemical Corporation), but the exemplary embodiment is not limited to these examples.

Specific examples of the cyan color pigment include C. I. Pigment Blue-1, C. I. Pigment Blue-2, C. I. Pigment Blue-3, C. I. Pigment Blue-15, C. I. Pigment Blue-15:1, C. I. Pigment Blue-15:2, C. I. Pigment Blue-15:3, C. I. Pigment Blue-15:4, C. I. Pigment Blue-16, C. I. Pigment Blue-22, and C. I. Pigment Blue-60, but the exemplary embodiment is not limited to these examples.

Specific examples of the magenta color pigment include C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-177, C. I. Pigment Red-184, and C. I. Pigment Red-202, and C. I. Pigment Violet-19, but the exemplary embodiment is not limited to these examples.

Specific examples of the yellow pigment include C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-138, C. I. Pigment Yellow-151, C. I. Pigment Yellow-154, and C. I. Pigment Yellow-180, but the exemplary embodiment is not limited to these examples.

Here, in a case where a pigment is used as a colorant, a pigment dispersant is preferably used together with the pigment. Examples of the pigment dispersant used include a polymer dispersant, an anionic surfactant, a cationic surfactant, an amphoteric surfactant, and a nonionic surfactant.

As the polymer dispersant, a polymer having both a hydrophilic structural portion and a hydrophobic structural portion is suitably used. As the polymer having both a hydrophilic structural portion and a hydrophobic structural portion, for example, a condensation polymer and an addition polymer are used. As the condensation polymer, known polyester dispersants may be exemplified. As the addition polymer, an addition polymer formed from a monomer having an α,β-ethylenically unsaturated group may be exemplified. By copolymerizing a monomer having an α,β-ethylenically unsaturated group which has a hydrophilic group and a monomer having an α,β-ethylenically unsaturated group which has a hydrophobic group in combination, a desired polymer dispersant is obtained. In addition, a homopolymer formed from a monomer having an α,β-ethylenically unsaturated group which has a hydrophilic group may also be used.

As the monomer having an α,β-ethylenically unsaturated group which has a hydrophilic group, monomers having a carboxyl group, a sulfonate group, a hydroxyl group, or a phosphate group, for example, acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinyl naphthalene, vinyl alcohol, acrylamide, methacryloxyethyl phosphate, bismethacryloxyethyl phosphate, methacryloxyethylphenyl acid phosphate, ethylene glycol dimethacrylate, and diethylene glycol dimethacrylate may be exemplified.

Examples of the monomer having an $\alpha,\beta$-ethylenically unsaturated group which has a hydrophobic group include styrene derivatives such as styrene, $\alpha$-methyl styrene, and vinyl toluene, vinyl cyclohexane, vinyl naphthalene, vinyl naphthalene derivatives, acrylic acid alkyl esters, methacrylic acid alkyl esters, methacrylic acid phenyl esters, methacrylic acid cycloalkyl esters, crotonic acid alkyl esters, itaconic acid dialkyl esters, and maleic acid dialkyl esters.

Examples of preferable copolymers as the polymer dispersant include a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, an acrylic acid alkyl ester-acrylic acid copolymer, a methacrylic acid alkyl ester-methacrylic acid copolymer, a styrene-methacrylic acid alkyl ester-methacrylic acid copolymer, a styrene-acrylic acid alkyl ester-acrylic acid copolymer, a styrene-methacrylic acid phenyl ester-methacrylic acid copolymer, and a styrene-methacrylic acid cyclohexyl ester-methacrylic acid copolymer. In addition, a monomer having a polyoxyethylene group or a hydroxyl group may be copolymerized with these polymers.

The weight average molecular weight of the polymer dispersant may be, for example, from 2,000 to 50,000.

These polymer dispersants may be used alone or in combinations of two or more kinds thereof. Although the content of the polymer dispersant varies greatly depending on pigments, the content may be from 0.1% by weight to 100% by weight with respect to the pigment.

As the pigment, a pigment (hereinafter, referred to as a self-dispersion type pigment) which self-disperses in water may also be exemplified. The self-dispersion type pigment refers to a pigment which has a solubilizing group with respect to water on the pigment surface, and disperses in water even in a case where a polymer dispersant is not present. The self-dispersion type pigment is obtained by performing, for example, a surface modification treatment such as an acid-base treatment, a coupling agent treatment, a polymer graft treatment, a plasma treatment, or an oxidation/reduction treatment, with respect to a pigment.

As the self-dispersion type pigment, other than pigments in which a surface modification treatment is performed with respect to the pigments, commercially available self-dispersion pigments such as Cab-o-jet-200, Cab-o-jet-300, Cab-o-jet-400, IJX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M manufactured by Cabot Corporation, and Microjet Black CW-1 and CW-2 manufactured by Orient Chemical Industries Co., Ltd. may be exemplified.

The self-dispersing pigment is preferably a pigment which has at least a sulfonic acid, sulfonate, carboxylic acid, or carboxylate on the surface thereof as a functional group, and more preferably a pigment which has at least a carboxylic acid or carboxylate on the surface thereof as a functional group.

Here, as the pigment, a pigment which is coated with a resin may also be exemplified. This pigment is called a microcapsule pigment, and commercially available microcapsule pigments manufactured by DIC Corporation, Toyo Ink Co., Ltd., or the like may be exemplified. Moreover, the pigment is not limited to commercially available microcapsule pigments, and microcapsule pigments manufactured in accordance with the purpose may be used.

In addition, as the pigment, resin-dispersing type pigments obtained by physical adsorption or chemical bonding of a polymer compound to a pigment may also be exemplified.

In addition, as the pigment, in addition to black pigments and pigments having three primary colors of cyan, magenta, and yellow, pigments having a specific color such as red, green, blue, brown, or white, metallic luster pigments having a gold color or a silver color, colorless or light-colored extender pigments, and plastic pigments may also be exemplified.

In addition, as the pigment, particles in which a dye or a pigment is fixed on the surface of silica, alumina, or polymer beads as a core, an insoluble laked product of dye, a colored emulsion, and a colored latex may also be exemplified.

As the colorant, other than pigments, dyes such as a hydrophilic anionic dye, a direct dye, a cationic dye, a reactive dye, a polymer dye, and an oil-soluble dye, wax powders and resin powders colored with a dye, emulsions, a fluorescent dye, a fluorescent pigment, and the like may also be exemplified.

The volume average particle diameter of the colorant, for example, is from 10 nm to 1,000 nm.

The volume average particle diameter of the colorant refers to a particle diameter of a colorant itself, or in a case where an additive such as a dispersant is attached to the colorant, a particle diameter of the colorant on which the additive is attached.

Measurement of the volume average particle diameter is performed using a Microtrac UPA particle size analyzer UPA-UT151 (manufactured by Microtrac). The measurement is performed by putting a 1,000-fold diluted specific ink in a measuring cell. Moreover, as the input values at the time of measurement, the viscosity of the specific ink-diluted liquid is adopted as a viscosity, and the refractive index of a colorant is adopted as a particle refractive index.

The content (concentration) of the colorant is preferably from 1% by weight to 25% by weight, and more preferably from 2% by weight to 20% by weight with respect to the specific ink.

Polymer Particles

The polymer particles will be described.

The polymer particles are components for increasing fixability of an image obtained by the specific ink with respect to a recording medium.

As the polymer particles, particles (latex particles) of a styrene-acrylic acid copolymer, a styrene-acrylic acid-sodium acrylate copolymer, a styrene-butadiene copolymer, polystyrene, an acrylonitrile-butadiene copolymer, an acrylic acid ester copolymer, polyurethane, a silicon-acrylic acid copolymer, or an acryl-modified fluorine resin may be exemplified. Moreover, as the polymer particles, core-shell type polymer particles in which the composition in the center portion and the composition in the outer edge portion of a particle are different from each other may be exemplified.

The polymer particles may be polymer particles obtained by being dispersed in the specific ink using an emulsifier, or may be polymer particles obtained by being dispersed in the specific ink without using an emulsifier. As the emulsifier, a surfactant and a polymer having a hydrophilic group such as a sulfonic acid group or a carboxyl group (for example, a polymer in which a hydrophilic group is grafted, or a polymer obtained from a monomer having a hydrophilic portion and a monomer having a hydrophobic portion) may be exemplified.

The volume average particle diameter of the polymer particles is preferably from 10 nm to 300 nm, and more preferably from 10 nm to 200 nm from the viewpoint of glossiness and abrasion resistance of an image.

Measurement of the volume average particle diameter of the polymer particles is performed using a Microtrac UPA particle size analyzer UPA-UT151 (manufactured by Microtrac). The measurement is performed by putting a 1,000-fold diluted specific ink in a measuring cell. Moreover, as the input values at the time of measurement, the viscosity of the specific ink-diluted liquid is adopted as a viscosity, and the refractive index of a polymer is adopted as a particle refractive index.

The glass transition temperature of the polymer particles is preferably from −20° C. to 80° C., and more preferably from −10° C. to 60° C. from the viewpoint of abrasion resistance of an image.

Moreover, the glass transition temperature of the polymer particles is determined by a DSC curve obtained by differential scanning calorimetry (DSC), and more specifically, is determined by "An extrapolated starting temperature of glass transition" described in a method for determining a glass transition temperature of "Transition temperature measuring method of plastic" in JIS K7121-1987.

The content of the polymer particles is preferably from 0.1% by weight to 10% by weight, and more preferably from 0.5% by weight to 5% by weight with respect to the specific ink from the viewpoint that image peeling is prevented in the case of slightly permeable paper and strike-through and bleeding of an image are prevented in the case of permeable paper, and further from the viewpoint of ejection stability.

Water

The water will be described.

As water, ion exchange water, ultrapure water, distilled water, and ultrafiltration water may be suitably exemplified from the viewpoint of preventing impurities from being mixed in or microorganisms from being generated.

The content of the water is, for example, preferably from 10% by weight to 95% by weight, and more preferably from 30% by weight to 90% by weight with respect to the specific ink.

Water-Soluble Organic Solvent

The water-soluble organic solvent will be described.

Examples of the water-soluble organic solvent include polyols, derivatives of polyols, nitrogen-containing solvents, alcohols, and sulfur-containing solvents. As the water-soluble organic solvent, propylene carbonate, ethylene carbonate, and the like may also be exemplified.

Examples of the polyols include ethylene glycol, diethylene glycol, propylene glycol, butylene glycol, triethylene glycol, 1,5-pentanediol, 1,2-hexanediol, 1,2,6-hexanetriol, glycerin, trimethylol propane, sugar alcohols such as xylitol, and sugars such as xylose, glucose, and galactose.

Examples of the derivatives of polyols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Examples of the nitrogen-containing solvents include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

The water-soluble organic solvents may be used alone or in combination of two or more kinds thereof.

The content of the water-soluble organic solvent is preferably from 1% by weight to 60% by weight, and more preferably from 1% by weight to 40% by weight with respect to the water.

Surfactant

The surfactant will be described.

The specific ink may include a surfactant other than the above-described ethylene oxide adducts of acetylene glycol and polyether-modified silicone. As other surfactants, an anionic surfactant, a nonionic surfactant, a cationic surfactant, and an amphoteric surfactant may be exemplified, and an anionic surfactant and a nonionic surfactant are preferable.

Examples of the anionic surfactant include alkyl benzene sulfonate, alkyl phenyl sulfonate, alkyl naphthalene sulfonate, higher fatty acid salt, sulfate of higher fatty acid ester, sulfonate of higher fatty acid ester, sulfate and sulfonate of higher alcohol ether, higher alkyl sulfosuccinate, polyoxyethylene alkyl ether carboxylate, polyoxyethylene alkyl ether sulfates, alkyl phosphate, and polyoxyethylene alkyl ether phosphate.

Among these, as the anionic surfactant, dodecyl benzene sulfonate, isopropyl naphthalene sulfonate, monobutyl phenyl phenol monosulfonate, monobutyl biphenyl sulfonate, monobutyl biphenyl sulfonate, and dibutyl phenyl phenol disulfonate are favorable.

Examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkylalkanol amide, a polyethylene glycol polypropylene glycol block copolymer, and acetylene glycol.

Among these, as the nonionic surfactant, polyoxyethylene nonylphenyl ether, polyoxyethylene octyl phenyl ether, polyoxyethylene docecyl phenyl ether, polyoxyethylene alkyl ether, polyoxyethylene fatty acid ester, sorbitan fatty acid ester, polyoxyethylene sorbitan fatty acid ester, fatty acid alkylolamide, a polyethylene glycol polypropylene glycol block copolymer, and acetylene glycol are favorable.

Other than the above-described nonionic surfactants, as the nonionic surfactant, silicone surfactants such as polysiloxane oxyethylene adduct; fluorine surfactants such as perfluoroalkyl carboxylate, perfluoroalkyl sulfonate, and oxyethylene perfluoroalkyl ether; and biosurfactants such as spiculisporic acid, rhamnolipid, and lysolecithin may also be exemplified.

The hydrophile-lipophile balance (HLB) of the other surfactants may be, for example, in a range from 3 to 20 in consideration of solubility.

The other surfactants may be used alone or in combination of two or more kinds thereof.

The content of the other surfactant is preferably from 0.1% by weight to 10% by weight, more preferably from 0.1% by weight to 5% by weight, still more preferably from 0.2% by weight to 3% by weight with respect to the specific ink.

Other Additives

Other additives will be described.

The specific ink may include other additives.

Examples of the other additives include an ink ejection improving agent (polyethylene imine, polyamines, polyvinylpyrrolidone, polyethylene glycol, ethyl cellulose, carboxymethyl cellulose, and the like), a conductivity/pH adjusting agent (compounds of alkali metals such as potassium hydroxide, sodium hydroxide, and lithium hydroxide), a reactive dilution solvent, a penetrating agent, a pH buffering agent, an antioxidant, a fungicide, a viscosity modifier, a conductive agent, a chelating agent, an ultraviolet absorbing agent, and an infrared absorbing agent.

Physical Properties of Specific Ink

Suitable physical properties of the specific ink will be described.

The pH of the specific ink is preferably in a range from 4 to 10, and more preferably a range from 5 to 9.

Here, as the pH of the specific ink, a value measured in an environment of a temperature of 23±5° C. and a humidity of 55±5% R.H. using a pH/conductivity meter (MPC227, manufactured by Mettler-Toledo International Inc.) is adopted.

The conductivity of the specific ink is in, for example, a range from 0.01 S/m to 0.5 S/m (preferably a range from 0.01 S/m to 0.25 S/m, and more preferably a range from 0.01 S/m to 0.20 S/m).

Measurement of the conductivity is performed using an MPC227 (pH/conductivity meter, manufactured by Mettler-Toledo International Inc.).

The viscosity of the specific ink is in, for example, a range from 1.5 mPa·s to 30 mPa·s (preferably in a range from 1.5 mPa·s to 20 mPa·s).

The viscosity is measured under the conditions of a measurement temperature of 23° C. and a shear velocity of 1400 s$^{-1}$ using a TV-20 (manufactured by Toki Sangyo Co., Ltd.) as a measuring device.

Here, the specific ink may be, for example, any one of a black ink, a cyan ink, a magenta ink, a yellow ink, and an intermediate color ink other than these colors.

In addition, the specific inks may be used as an ink set (preferably, all are specific inks) including at least one of such specific inks.

Recording Method and Recording Apparatus

The recording method according to the exemplary embodiment includes an ejecting process of ejecting the specific ink on a recording medium in which the maximum liquid absorption amount of the specific ink within a contact time of 500 milliseconds measured by a dynamic scanning liquid absorption meter is equal to or greater than 5 ml/m$^2$.

The ejecting process is obtained by an ejection head with which the recording apparatus according to the exemplary embodiment is equipped, that is, ejection head for ejecting the specific ink on a recording medium in which the maximum liquid absorption amount of the specific ink within a contact time of 500 milliseconds measured by a dynamic scanning liquid absorption meter is equal to or greater than 5 ml/m$^2$.

In addition, in a case where the maximum liquid absorption amount in a recording medium is from 5 ml/m$^2$ to 15 ml/m$^2$, that is, in a case where the recording medium is slightly permeable paper, the recording method according to the exemplary embodiment preferably further includes a drying process of drying the specific ink ejected on the recording medium at a temperature at which the surface temperature of the recording medium becomes a temperature in a range from 35° C. to 200° C.

The drying process is obtained by a drying device and a control device with which the recording apparatus according to the exemplary embodiment is equipped, that is, a drying device for drying the specific ink ejected on a recording medium and in a case where the maximum liquid absorption amount in a recording medium is from 5 ml/m$^2$ to 15 ml/m$^2$, a control device for controlling the drying device so that the surface temperature of the recording medium becomes a temperature in a range from 35° C. to 200° C.

The recording apparatus according to the exemplary embodiment may be equipped with an ink cartridge (cartridge according to the exemplary embodiment) which accommodates the specific ink and is configured so as to be detachable from the recording apparatus.

Hereinafter, the recording method according to the exemplary embodiment will be described in detail by showing an example of the recording apparatus with reference to the accompanying drawings.

FIG. 1 is a schematic configuration diagram showing the recording apparatus according to the exemplary embodiment.

A recording apparatus 10 according to the exemplary embodiment is equipped with an ejection head 122 (an ejection device 121 having the ejection head 122) for ejecting the specific ink on a recording medium P.

In the recording apparatus 10 according to the exemplary embodiment, a recording method including an ejecting process of ejecting the specific ink on the recording medium P is obtained. Thereby, an image is recorded on the recording medium P by the specific ink.

More specifically, the recording apparatus 10 according to the exemplary embodiment is equipped with an image recording unit 12 for recording an image on the recording medium P.

The recording apparatus 10 is equipped with a pretreatment unit 14 in which the recording medium P to be supplied to the image recording unit 12 is accommodated, and a buffer unit 16 for adjusting the transport amount of the recording medium P supplied from the pretreatment unit 14 to the image recording unit 12. The buffer unit 16 is disposed between the image recording unit 12 and the pretreatment unit 14.

The recording apparatus 10 is equipped with, for example, a post-treatment unit 18 which accommodates the recording medium P discharged from the image recording unit 12, and a buffer unit 20 for adjusting the transport amount or the like of the recording medium P discharged from the image recording unit 12 to the post-treatment unit 18. The buffer unit 20 is disposed between the image recording unit 12 and the post-treatment unit 18.

The recording apparatus 10 is equipped with a cooling unit 22 for cooling the recording medium P taken out from the image recording unit 12, which is disposed between the image recording unit 12 and the buffer unit 20.

The image recording unit 12 is equipped with, for example, a roll member (sign is omitted) for guiding the recording medium P along a transport path R of the recording medium P, and the ejection device 121 for recording an image by ejecting the specific ink (droplets of the specific ink) on the recording medium P transported along the transport path R of the recording medium P.

The ejection device 121 is equipped with the ejection head 122 for ejecting the specific ink on the recording medium P.

The ejection head 122 is, for example, an elongated recording head in which an effective recording region (disposition region of nozzles for ejecting the specific ink) is equal to or wider than the width (the length in the direction intersecting (for example, perpendicular) the transport direction of the recording medium P) of the recording medium P.

Moreover, the ejection head 122 is not limited thereto, and may be an ejection head which is shorter than the width of the recording medium P, and has a system (so-called carriage system) of ejecting the specific ink while moving in the width direction of the recording medium P.

The ejection head 122 may also have a so-called thermal system of ejecting droplets of the specific ink by heat, may also have a so-called piezoelectric system of ejecting droplets of the specific ink by pressure, or know systems may be applied.

The ejection head 122 has, for example, an ejection head 122K for recording an image having a K color (black), an ejection head 122Y for recording an image having a Y color (yellow), an ejection head 122M for recording an image having a M color (magenta), and an ejection head 122C for recording an image having a C color (cyan), each by ejecting the specific ink on the recording medium P. Furthermore, the ejection head 122K, the ejection head 122Y, the ejection head 122M, and the ejection head 122C are arranged so as to face the recording medium P from the upstream side to the downstream side in the transport direction (hereinafter, simply referred to as "paper transport direction" in some cases) of the recording medium P in this order. Moreover, regarding the description of the ejection heads, in a case of not distinguishing K, Y, M, and C, K, Y, M, and C in reference signs are omitted.

The ejection heads 122K, 122Y, 122M, and 122C are respectively connected to ink cartridges 123K, 123Y, 123M, and 123C having each color detachable from the recording apparatus 10 through supply pipes (not shown), and inks having each color are supplied to each ejection head 122 by the ink cartridge 123.

Here, at least one of the inks accommodated in the ink cartridges 123K, 123Y, 123M, and 123C having each color may be the above-described specific inks, and it is preferable that all the inks be the specific inks.

The ejection heads 122 are not limited to the form of disposing the four ejection heads 122 corresponding to each of the four colors, and depending on the purpose, the ejection heads 122 may have a form of disposing four or more ejection heads 122 corresponding to each of four or more colors obtained by adding other intermediate colors.

Here, as the ejection head 122, for example, any one of an ejection head 122 (for example, an ejection head of 600 dpi) for low resolution for ejecting the specific ink in a range of the amount of ink droplets from 1 pl to 15 pl and an ejection head 122 (for example, an ejection head of 1,200 dpi) for high resolution for ejecting the specific ink in a range of the amount of ink droplets of less than 10 pl may be equipped. In addition, the ejection device 121 may be equipped with both the ejection head 122 for low resolution and the ejection head 122 for high resolution. The amount of ink droplets of the ejection head 122 is in a range of the maximum ink droplet amount of the specific ink. In addition, dpi means "dot per inch".

In the image recording unit 12, a drying drum 124 (one example of a drying device) for drying an image (the specific ink) on the recording medium P while winding the back surface of the recording medium P and driven-rotating in contact with the recording medium P transported is disposed on the downstream side in the paper transport direction with respect to the ejection head 122.

A heat source (for example, a halogen heater or the like: not shown) is built into the inside of the drying drum 124. The drying drum 124 dries an image (the specific ink) on the recording medium P by heating using the heat source.

Around the drying drum 124, a warm air blowing device 126 (one example of a drying device) for drying an image (the specific ink) on the recording medium P is disposed. An image (the specific ink) on the recording medium P wound on the drying drum 124 is dried by warm air by the warm air blowing device 126.

The recording apparatus 10 is equipped with at least a control device 128 for controlling the drying drum 124 and the warm air blowing device 126 which are drying devices. The control device 128 may be configured as a computer for performing control and various operations of the entire recording apparatus 10.

Specifically, the control device 128 is equipped with, for example, a CPU (Central Processing Unit), a ROM (Read Only Memory) in which various programs are stored, a RAM (Random Access Memory) which is used as a work area when programs are run, a nonvolatile memory for storing various information, and an input-output interface (I/O). Each of the CPU, the ROM, the RAM, and the I/O is connected, for example, through a bus.

The control device 128 is connected to each portion (for example, the drying drum 124 and the warm air blowing device 126 which are drying devices, and an input portion (not shown) for inputting information about the recording medium) of the recording apparatus 10 through the I/O.

When information about the recording medium is input to the input portion by a user, the control device 128 acquires the information about the recording medium, and determines whether the recording medium is slightly permeable paper or permeable paper. Furthermore, the control device 128 controls the drying drum 124 and the warm air blowing device 126 which are drying devices based on the determined information.

In a case where the recording medium is determined to be slightly permeable paper, the control device 128 controls the drying devices so that the surface temperature of the slightly permeable paper becomes a temperature in a range from 35° C. to 200° C.

Here, in a case where the recording medium is permeable paper, there is no problem even if drying by the drying device is not performed.

From the viewpoint of saving energy, the specific ink on permeable paper is preferably naturally dried.

In a case where the recording medium is determined to be permeable paper, for example, the control device 128 performs control such that the heat source in the drying drum 124 does not perform heating, and the warm air blowing device 126 does not perform warm air blowing.

The drying process is performed by the drying drum 124 and the warm air blowing device 126 which are drying devices.

Here, the drying process in a case where the recording medium P is slightly permeable paper is preferably performed at a temperature at which the surface temperature of the slightly permeable paper becomes a temperature in a range from 35° C. to 200° C. (more preferably from 40° C. to 150° C.)

The temperature at which the surface temperature of the slightly permeable paper becomes a temperature within the above range is a drying temperature of the drying device, and in order to adjust the drying temperature, the control device 128 controls the temperature of the heat source in the drying drum 124, and the temperature of warm air and the air blowing amount of the warm air blowing device 126.

Moreover, the drying temperature of the drying device may be set based on the temperature of the surface temperature of the recording medium P measured by a temperature sensor or the like provided in the image recording unit 12, and may be set based on information such as the form of the drying device, the distance from the heat source, or the like.

In addition, setting of the drying temperature may be performed by the control device 128, or may be performed by input of information by a user.

Here, in the image recording unit 12, other drying devices such as a near infrared ray heater (not shown) for drying an image (the specific ink) on the recording medium P, a laser irradiation device, or the like may be disposed on the downstream side in the paper transport direction with respect to the ejection head 122. Other drying devices such as a near infrared ray heater, a laser irradiation device, or the like may be disposed instead of at least one of the drying drum 124 and the warm air blowing device 126, or may be disposed in addition to the drying drum 124 and the warm air blowing device 126.

On the other hand, the pretreatment unit 14 is equipped with a supply roll 14A on which the recording medium P to be supplied to the image recording unit 12 is wound, and the supply roll 14A is rotatably supported by a frame member not shown.

In the buffer unit 16, for example, a first pass roller 16A, a dancer roller 16B, and a second pass roller 16C are disposed along the paper transport direction. The dancer roller 16B adjusts the tension of the recording medium P transported to the image recording unit 12 and the transport amount of the recording medium P by moving up and down in FIG. 1.

The post-treatment unit 18 is equipped with a winding roll 18A as an example of a transport portion which winds the recording medium P on which an image is recorded. The winding roll 18A is rotated by receiving a rotational force from a motor (not shown), and thereby, the recording medium P is transported along the transport path R.

In the buffer unit 20, for example, a first pass roller 20A, a dancer roller 20B, and a second pass roller 20C are disposed along the paper transport direction. The dancer roller 16B adjusts the tension of the recording medium P discharged to the post-treatment unit 18 and the transport amount of the recording medium P by moving up and down in FIG. 1.

In the cooling unit 22, plural cooling rollers 22A are disposed. By transporting the recording medium P between the plural cooling rollers 22A, the recording medium P is cooled.

Moreover, in the image recording unit 12, in a case where heating of the recording medium P and an image (the specific ink) is not performed by the drying device (for example, a case where the recording medium. P is permeable paper, or the like), cooling of the recording medium P by the cooling unit 22 may not be performed.

Next, operation (recording method) by the recording apparatus 10 according to the exemplary embodiment will be described.

In the recording apparatus 10 according to the exemplary embodiment, first, the recording medium P is transported from the supply roll 14A in the pretreatment unit 14 to the image recording unit 12 through the buffer unit 16.

Then, in the image recording unit 12, the specific ink is ejected from each of the ejection heads 122 of the ejection device 121 on the recording medium P. Thereby, an image by the specific ink is recorded on the recording medium P.

Thereafter, depending to the permeation degree of the specific ink on the recording medium. P, drying of an image (the specific ink) on the recording medium P is performed.

Specifically, for example, in a case where the recording medium P is slightly permeable paper, an image (the specific ink) on the recording medium P is dried from the back side (surface on the opposite side to the recording surface) of the recording medium P by the drying drum 124, and the specific ink (image) ejected on the recording medium P is dried from the surface side (recording surface) of the recording medium P by the warm air blowing device 126. That is, the specific ink ejected on the recording medium P which is slightly permeable paper is dried by the drying drum 124 and the warm air blowing device 126. At this time, the drying temperature of the drying drum 124 and the warm air blowing device 126 is preferably such a temperature that the surface temperature of the recording medium P which is slightly permeable paper becomes a temperature in a range from 35° C. to 200° C.

In addition, in a case where the recording medium P is permeable paper, for example, heat drying is not performed by the drying drum 124 and the warm air blowing device 126, and an image (the specific ink) on the recording medium P naturally dries while being transported along the transport path R.

Then, if necessary, in the cooling unit 22, the recording medium P on which an image is recorded is cooled by the cooling roller 22A.

Furthermore, the post-treatment unit 18 winds the recording medium P on which an image is recorded by the winding roll 18A through the buffer unit 16.

Through the above processes, an image by the specific ink is recorded on the recording medium P.

The recording medium P with an image recorded in the above manner is cut into a desired size through a cutting process.

In the recording apparatus 10 according to the exemplary embodiment, a method of directly ejecting droplets of the specific ink on the surface of the recording medium P by the ejection device 121 (ejection head 122) is described, however, the exemplary embodiment is not limited to this, and for example, a method of ejecting droplets of the specific ink on an intermediate transfer member and transferring the droplets of the specific ink on the intermediate transfer member onto the recording medium P may also be used.

With respect to the recording apparatus 10 according to the exemplary embodiment described above, a method of recording an image by ejecting the specific ink on the recording medium P which is roll form continuous paper is described above, but, for example, a method of recording an image by ejecting the specific ink on a sheet as the recording medium P may also be used.

Furthermore, as the slightly permeable paper in the exemplary embodiment, in addition to the coating paper described above, a resin film and the like may be exemplified.

In addition, it is needless to say that the exemplary embodiment is not intended to be limitedly interpreted, and is obtained within the range in which the requirements of the present invention are satisfied.

EXAMPLES

Hereinafter, the present invention will be described in detail based on examples, but the present invention is not limited to the examples.

Preparation of Ink

Carbon black (Mogul L: manufactured by Cabot Corporation) (colorant): 5% by weight Styrene/acrylic acid copolymer sodium neutralized product: 2.5% by weight (water-soluble resin, weight average molecular weight=30,000)

TOCRYL W-4627 (manufactured Toyochem Co., Ltd.): 5% by weight (solid content) (acrylic emulsion; polymer particles, volume average particle diameter=0.12 um, glass transition temperature=45° C.)

Glycerin: 10% by weight

Surfactant (compound described in Table 1): % by weight described in Table 1

Ion exchange water: residual part

After the above components are mixed, the mixture is filtered through a filter with a pore diameter of 5 μm, and specific inks 1 to 3 and inks for comparison A to D are obtained.

Measurement of Physical Properties

Regarding each ink obtained in the above-described manner, the static surface tension, the dynamic surface tension at 1 millisecond and 1 second, and a fluctuation range of dynamic surface tension are measured by the above-described methods.

The measurement results are shown in Table 1.

In addition, the maximum liquid absorption amount of each ink with respect to "OK Topcoat+(basis weight of 79.1 kg/cm²)" manufactured by Oji Paper Co., Ltd. and "Npi form Next IJ (basis weight of 64 kg/cm²)" manufactured by Nippon Paper Industries Co., Ltd. are measured by the above-described method. As a result, it is confirmed that OK Topcoat+ is slightly permeable paper, and Npi form Next IJ is permeable paper.

factured by Oji Paper Co., Ltd. and permeable paper: "Npi form Next IJ (basis weight of 64 kg/cm²)" manufactured by Nippon Paper Industries Co., Ltd. are used.

Here, details of the recording apparatus are as follows.

Details of Recording Apparatus

Recording speed (recording medium transport speed): 25 m/min

Preset temperature of drying drum: 100° C.

Preset temperature of warm air blowing device: 100° C.

Transportation distance from drying drum to cooling roller: within 1 m

The above-described ink is filled into the recording apparatus.

Using the recording apparatus, the following image recording is performed.

Image Recording

Using each recording apparatus, on a recording medium, ink is ejected from a piezo head (maximum amount of ink droplets of 11 pl) of 600 dpi to record a solid image of 1.5 cm×1.5 cm and an image having characters and ruled lines. Then, the images are dried by the drying drum and the warm air blowing device, and cooling is performed by the cooling roller. Through this process, images are recorded on pressure-sensitive adhesive layers by the ink (with heat drying).

Moreover, without heating by a heating source in the drying drum and the warm air blowing device, in the same manner except that cooling in the cooling roller is not performed, images are recorded on recording media (without heat drying).

Then, the images after recording are visually observed, and image peeling, strike-through of an image, and bleeding of an image are evaluated. The evaluation criteria are as follows. The evaluation results are shown in the following Table 2.

Evaluation Criteria of Image Peeling

A: Image peeling is not observed

B: Partial image peeling is observed

TABLE 1

| | Surfactant | | | | Presence or absence of polymer particles | Static surface tension (mN/m) | Dynamic surface tension (mN/m) | | |
|---|---|---|---|---|---|---|---|---|---|
| Ink type | Type | Amount (% by weight) | Type | Amount (% by weight) | | | 1 millisecond | 1 second | Fluctuation range |
| 1 | Olfine E1010 | 2 | Silface SAG002 | 0.1 | Present | 26 | 27.8 | 26.6 | 1.2 |
| 2 | Olfine E1010 | 2 | Olfine EXP.4123 | 2.0 | Present | 22 | 27.7 | 26.5 | 1.2 |
| 3 | Olfine E1010 | 2 | Olfine EXP.4001 | 1.5 | Present | 25 | 30.3 | 28.7 | 1.6 |
| A | Olfine E1010 | 1 | Silface SAG002 | 0.1 | Present | 36 | 38.2 | 36.5 | 1.7 |
| B | Olfine E1010 | 1 | Silface SAG002 | 0.1 | Absent | 36 | 38.3 | 36.6 | 1.7 |
| C | Olfine E1010 | 2 | Olfine EXP.4300 | 1.0 | Absent | 26 | 29.9 | 27.9 | 2.0 |
| D | Olfine E1010 | 2 | Silface SAG503A | 0.1 | Present | 25 | 30.8 | 27.8 | 3.0 |

Examples 1 to 3 and Comparative Examples 1 to 4

Preparation of Recording Apparatus

A recording apparatus equipped with a piezo head (maximum amount of ink droplet of 11 pl) of 600 dpi as an ejection head for ink is prepared with the same configuration as that in FIG. 1.

In addition, as the recording medium P to be applied to the recording apparatus, the above-described slightly permeable paper: "OK Topcoat+(basis weight of 79.1 kg/cm²)" manu- C: Significant image peeling, thereby causing dirty, is observed Evaluation Criteria of Strike-Through of Image A: Slight strike-through of an image is observed B: Strike-through of an image is at a moderate level B: Significant strike-through of an image is observed Evaluation Criteria of Bleeding of Image A: Bleeding of an image is not observed B: Slight bleeding of an image is observed C: Significant bleeding of an image is observed

TABLE 2

| | Ink type | Presence or absence of polymer particles | Static surface tension (mN/m) | Fluctuation range of dynamic surface tension (mN/m) | Evaluation | | | | |
|---|---|---|---|---|---|---|---|---|---|
| | | | | | OK Topcoat + (slightly permeable paper) | | Npi form Next IJ (permeable paper) | | |
| | | | | | Presence or absence of heat drying | Image peeling | Presence or absence of heat drying | Strike-through of image | Bleeding of image |
| Example 1 | 1 | Present | 26 | 1.2 | Present (100° C.) | A | Absent | A | A |
| Example 2 | 2 | Present | 22 | 1.2 | Present (100° C.) | A | Absent | A | A |
| Example 3 | 3 | Present | 25 | 1.6 | Present (100° C.) | A | Absent | A | A |
| Comparative Example 1 | A | Present | 36 | 1.7 | Present (100° C.) | C | Absent | A | A |
| Comparative Example 2 | B | Absent | 36 | 1.7 | Present (100° C.) | C | Absent | B | B |
| Comparative Example 3 | C | Absent | 26 | 2.0 | Present (100° C.) | B | Absent | B | B |
| Comparative Example 4 | D | Present | 25 | 3.0 | Present (100° C.) | B | Absent | A | A |

From the above results, in Examples, it is found that when the specific inks are used, image peeling is prevented in the slightly permeable paper, and strike-through and bleeding of an image are prevented in the permeable paper, compared to the case where the inks for comparison are used.

In particular, it is found that even without heat drying, strike through and bleeding of an image are prevented in the case of the permeable paper.

Moreover, details of abbreviations for the surfactants in Table 1 are as follows.

Ethylene Oxide Adduct of Acetylene Glycol (Manufactured by Nissin Chemicals Co., Ltd.)
  Olfine E1010 (HLB=from 13 to 14)
  Olfine EXP.4001 (HLB=from 8 to 11)
  Olfine EXP.4123 (HLB=from 11 to 14)
  Olfine EXP.4300 (HLB=from 10 to 13)
Polyether-Modified Silicone (Manufactured by Nissin Chemicals Co., Ltd.)
  Silface SAG002 (HLB=12)
  Silface SAG503A (HLB=11)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording method comprising:
    ejecting an ink on an recording medium,
    wherein the ink includes a colorant, polymer particles, water, and an aqueous organic solvent, has a static surface tension of equal to or less than 27 mN/m, and has a fluctuation range of a dynamic surface tension from after 1 millisecond to after 1 second of from 0.2 mN/m to 2.0 mN/m when measuring the dynamic surface tension by a maximum bubble pressure method, and
    wherein the recording medium has a maximum liquid absorption amount of the ink within a contact time of 500 milliseconds measured by a dynamic scanning liquid absorption meter of equal to or greater than 5 ml/m2.

2. The recording method according to claim 1, further comprising:
    drying the ink ejected on the recording medium at a temperature at which the surface temperature of the recording medium becomes a temperature in a range from 35° C. to 200° C. in a case where the maximum liquid absorption amount on the recording medium is from 5 ml/m$^2$ to 15 ml/m$^2$.

3. The recording method according to claim 1, wherein the static surface tension of the ink is from 21 mN/m to 27 mN/m.

4. The recording method according to claim 1, wherein the fluctuation range of dynamic surface tension in the ink is from 0.2 mN/m to 1.8 mN/m.

5. The recording method according to claim 1, wherein the fluctuation range of dynamic surface tension in the ink is from 0.2 mN/m to 1.5 mN/m.

6. The recording method according to claim 1, wherein the ink has the dynamic surface tension after 1 millisecond of from 22 mN/m to 28 N/m and the dynamic surface tension after 1 second of from 22 mN/m to 28 mN/m.

7. The recording method according to claim 1, wherein the polymer particles are particles of a styrene-acrylic acid copolymer, a styrene-acrylic acid-sodium acrylate copolymer, a styrene-butadiene copolymer, polystyrene, an acrylonitrile-butadiene copolymer, an acrylic acid ester copolymer, polyurethane, a silicon-acrylic acid copolymer, or an acryl-modified fluorine resin.

8. The recording method according to claim 1, wherein a content of the polymer particles is from 0.1% by weight to 10% by weight with respect to the ink.

9. The recording method according to claim 1, wherein a content of the polymer particles is from 0.5% by weight to 5% by weight with respect to the ink.

10. The recording method according to claim 1, wherein the ink further includes a surfactant.

11. A recording apparatus comprising:
    an ejection head for ejecting an ink on a recording medium, wherein the ink includes a colorant, polymer particles, water, and an aqueous organic solvent, has a static surface tension of equal to or less than 27 mN/m, and has a fluctuation range of a dynamic surface tension from after 1 millisecond to after 1 second of from 0.2 mN/m to 2.0 mN/m when measuring the dynamic surface tension by a maximum bubble pressure method, and wherein the recording medium has a maximum liquid absorption amount of the ink within a contact time of 500 milliseconds measured by a dynamic scanning liquid absorption meter of equal to or greater than 5 ml/m$^2$.

12. The recording apparatus according to claim 11, further comprising:

a drying device for drying the ink ejected on the recording medium; and a control device for controlling the drying device so that the surface temperature of the recording medium becomes a temperature in a range from 35° C. to 200° C. in a case where the maximum liquid absorption amount on the recording medium is from 5 ml/m$^2$ to 15 ml/m$^2$.

\* \* \* \* \*